US009798098B2

(12) United States Patent
Tanabe et al.

(10) Patent No.: US 9,798,098 B2
(45) Date of Patent: Oct. 24, 2017

(54) OPTICAL MODULE

(71) Applicant: FUJIKURA LTD., Tokyo (JP)

(72) Inventors: Hiroyuki Tanabe, Sakura (JP); Yoshiharu Fujisaku, Sakura (JP); Masaaki Umezawa, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/242,831

(22) Filed: Aug. 22, 2016

(65) Prior Publication Data
US 2017/0059797 A1    Mar. 2, 2017

(30) Foreign Application Priority Data
Sep. 1, 2015   (JP) ................... 2015-172254

(51) Int. Cl.
*G02B 6/12*    (2006.01)
*G02B 6/42*    (2006.01)

(52) U.S. Cl.
CPC ........... *G02B 6/4265* (2013.01); *G02B 6/428* (2013.01); *G02B 6/4269* (2013.01)

(58) Field of Classification Search
CPC .................................................. G02B 6/4295
See application file for complete search history.

(56) References Cited

U.S. PATENT DOCUMENTS

| | | | | |
|---|---|---|---|---|
| 6,252,726 B1 * | 6/2001 | Verdiell | ................ | H01L 33/648 359/820 |
| 6,730,993 B1 * | 5/2004 | Boyer | ................. | H01S 5/02216 257/675 |
| 2002/0048295 A1 * | 4/2002 | Kato | ................... | H01S 5/02469 372/36 |
| 2008/0298402 A1 * | 12/2008 | Rossi | .................. | H01S 5/02248 372/20 |

FOREIGN PATENT DOCUMENTS

| | | |
|---|---|---|
| JP | 2002-134825 A | 5/2002 |
| JP | 2005-93507 A | 4/2005 |
| JP | 2009-99587 A | 5/2009 |

OTHER PUBLICATIONS

Office Action of Japanese Patent Application No. 2015-172254, dated Nov. 10, 2015.

* cited by examiner

*Primary Examiner* — Rhonda Peace
(74) *Attorney, Agent, or Firm* — Sughrue Mion, PLLC

(57) ABSTRACT

An optical module includes: a butterfly-type optical device including a body that contains a heating element in an interior space, a lid body that puts a lid on the interior space, and a plurality of pins; a substrate including a connecting surface to which the plurality of pins are connected; and a heat-dissipating component arranged to the connecting surface side, wherein the optical device is connected to the connecting surface with a heat-dissipating surface, of a part that has been arranged with the heating element, oriented to the heat-dissipating component side, and with a gap provided to a side of the lid body opposite to a side of the interior space.

13 Claims, 11 Drawing Sheets

FIRST EMBODIMENT

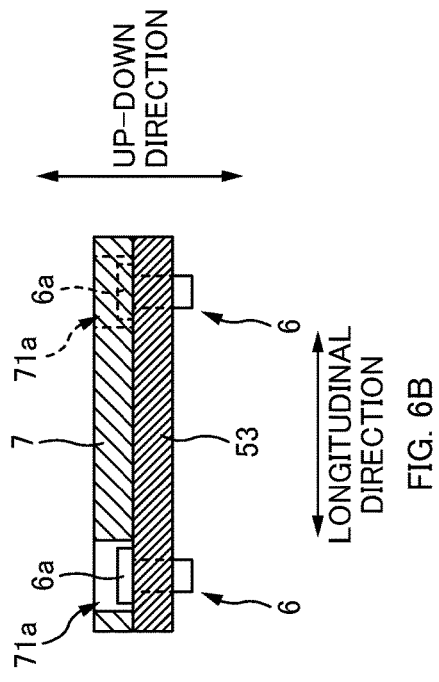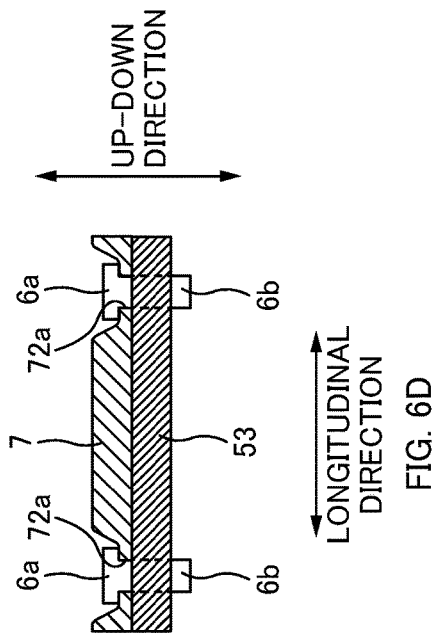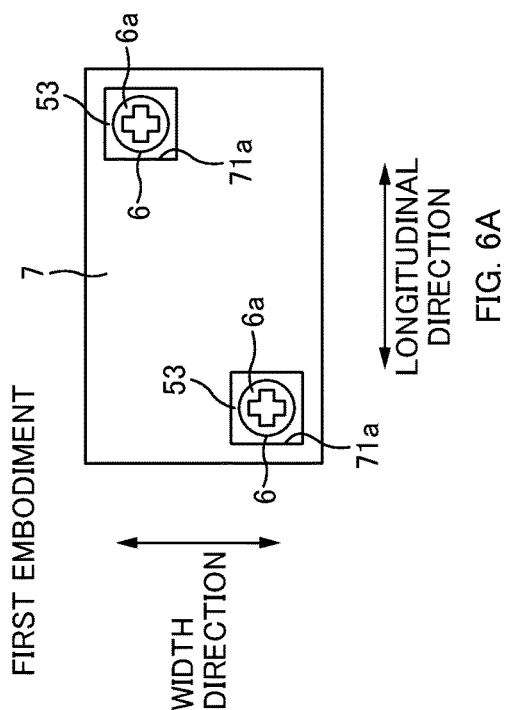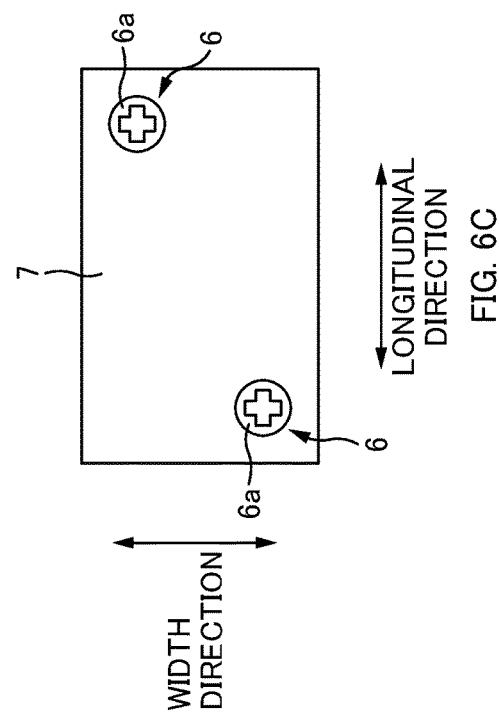

FIRST EMBODIMENT

THIRD EMBODIMENT

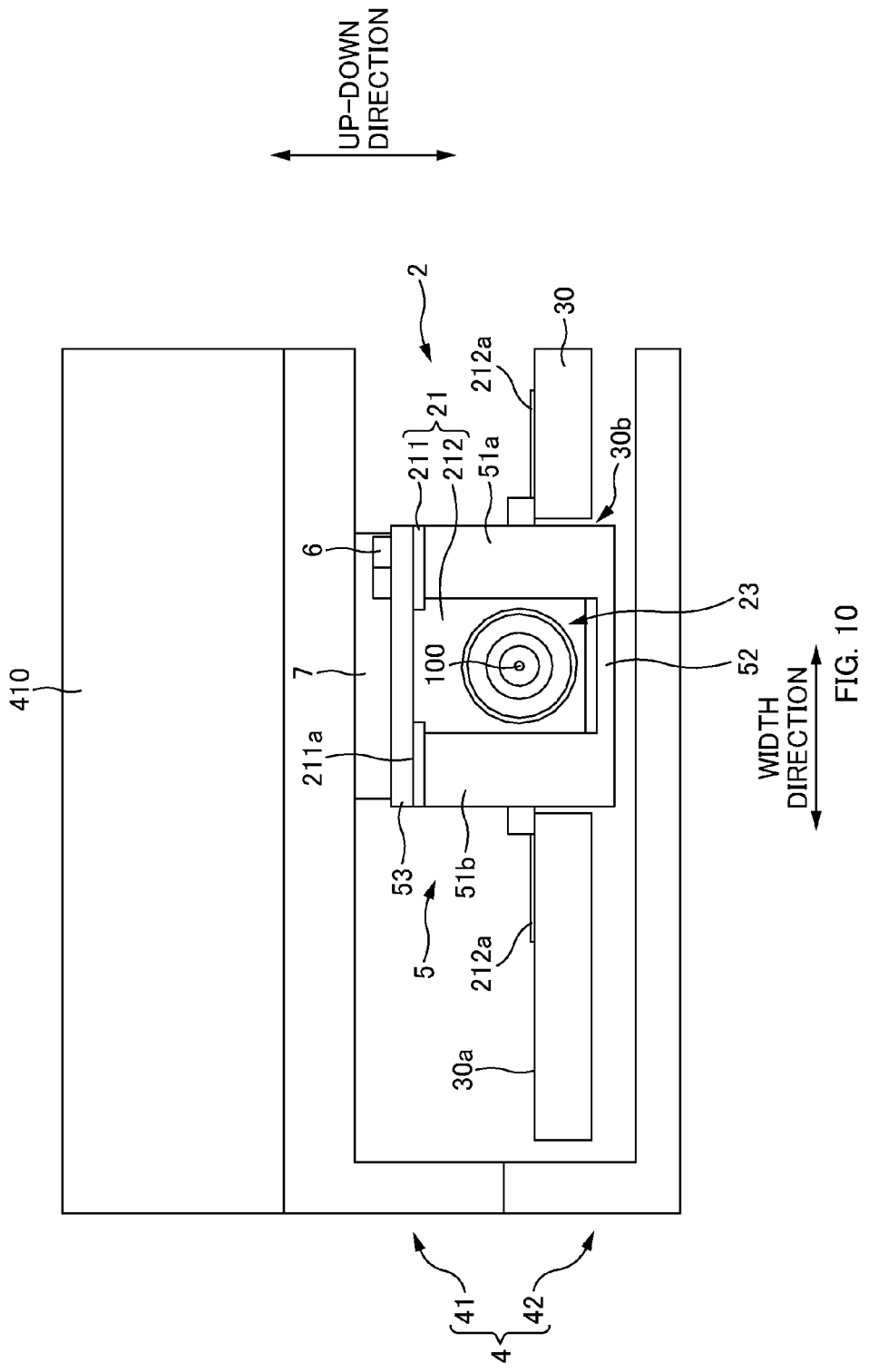

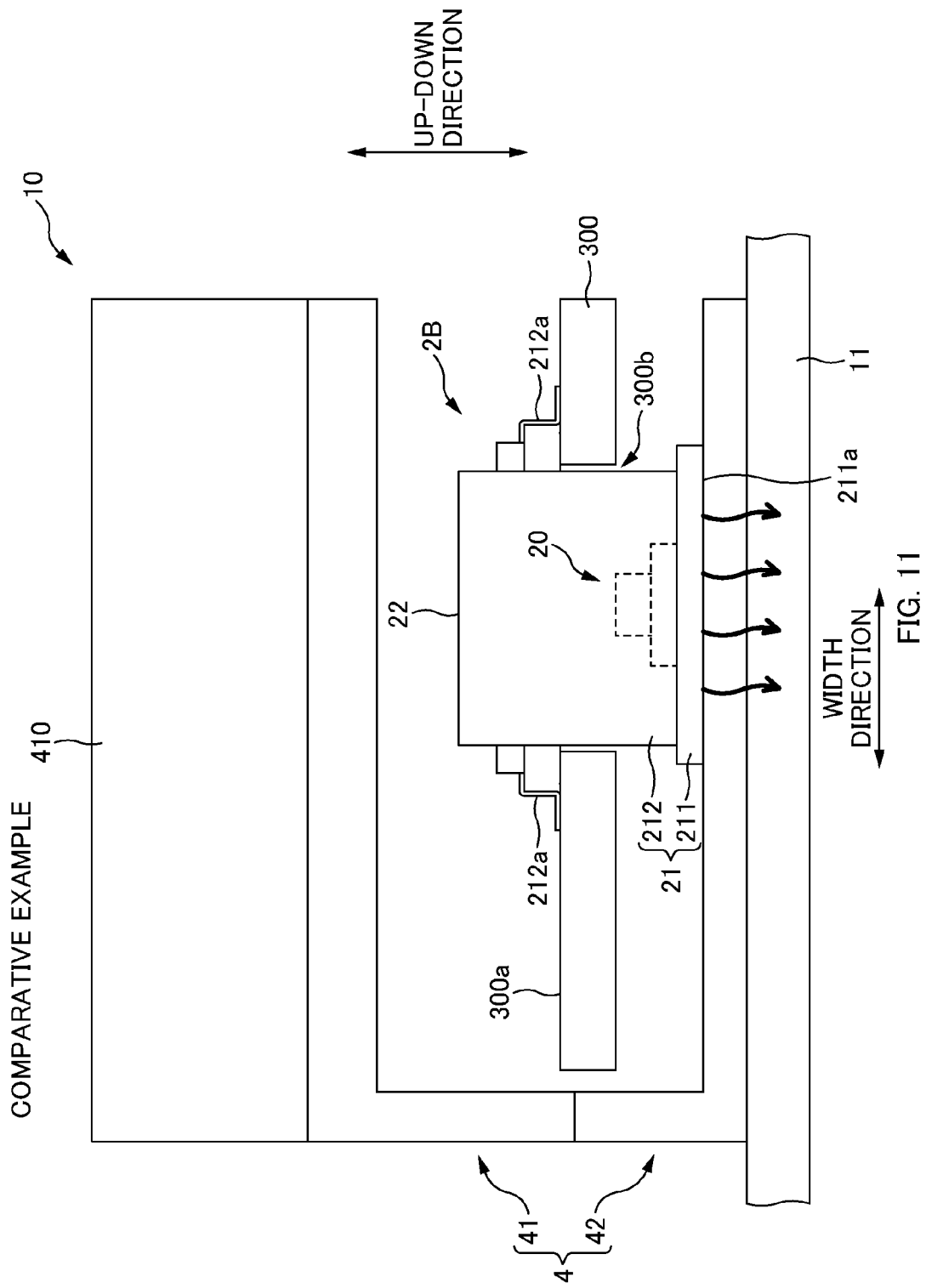

OPTICAL MODULE

CROSS-REFERENCE TO RELATED APPLICATIONS

The present application claims priority upon Japanese Patent Application No. 2015-172254 filed on Sep. 1, 2015, which is herein incorporated by reference.

BACKGROUND

Technical Field

The present invention relates to optical modules.

Related Art

An optical module that is mounted on a motherboard together with other electronic components and used is conventionally known. Japanese Patent Application Laid-open Publication No. 2005-93507 discloses an optical module including a heating optical device (an optical element module), an electronic circuit board, and a pair of housings that contain the optical device and the electronic circuit board.

Because the strength of a lid body that puts a lid on an interior space of the optical device is weak, the lid body is preferably prevented from getting pressed when a force is applied to the optical device.

SUMMARY

An advantage of some aspects of the present invention is that it is possible to provide an optical module in which dissipation of heat is improved, and in which a lid body that puts a lid on an interior space of an optical device is prevented from being pressed.

An aspect of the invention to achieve the above is an optical module including:

a butterfly-type optical device including
a body that contains a heating element in an interior space,
a lid body that puts a lid on the interior space, and
a plurality of pins;
a substrate including a connecting surface to which the plurality of pins are connected; and
a heat-dissipating component arranged to the connecting surface side,
wherein the optical device is connected to the connecting surface
with a heat-dissipating surface, of a part that has been arranged with the heating element, oriented to the heat-dissipating component side, and
with a gap provided to a side of the lid body opposite to a side of the interior space.

Other features of the present invention will become clear through the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 5A and FIG. 5C are perspective views, and FIG. 5B and FIG. 5D are sectional views in which an elastic member has been provided;

FIG. 6A to FIG. 6D show modified examples of an elastic member, FIG. 6A and FIG. 6C are top views, and FIG. 6B and FIG. 6D are sectional views in which the elastic member has been provided on a reinforcing part of a supporting member;

FIG. 9A is a side view and FIG. 9B is a front view;

FIG. 10 is a front view showing a configuration of an optical module of a fourth embodiment of this invention; and FIG. 11 is a front schematic view explaining a configuration of an optical module according to a comparative example.

DESCRIPTION OF EXEMPLARY EMBODIMENTS

Figure 1:
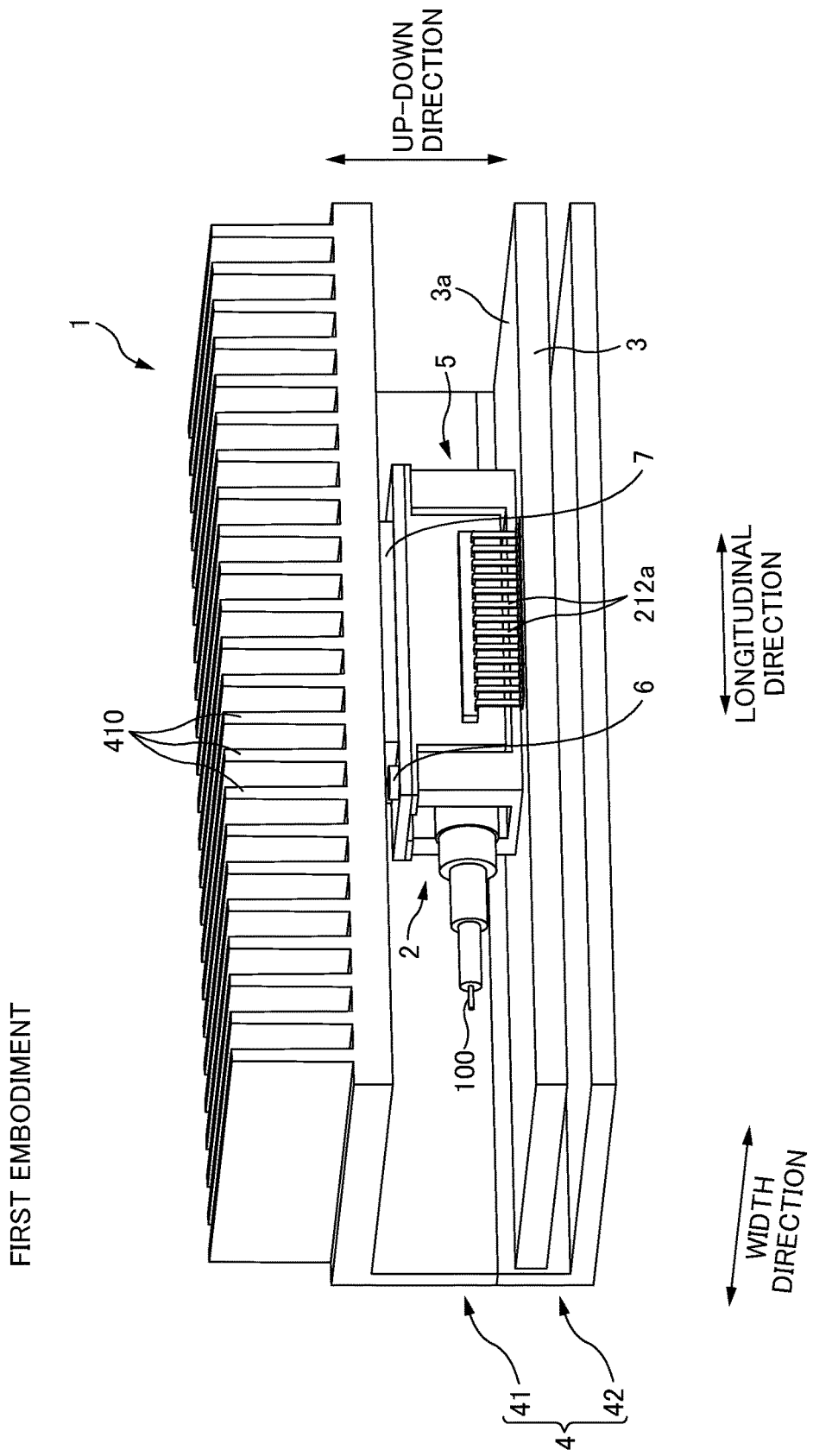
FIG. 1 is a perspective view showing a configuration example of an optical module according to a first embodiment of the present invention.

At least the following matters will become clear through the description of the present specification and the accompanying drawings.

An optical module will become clear, the optical module including:

a butterfly-type optical device including a plurality of pins;
a substrate including a connecting surface to which the plurality of pins are connected; and
a heat-dissipating component arranged to the connecting surface side,
wherein the optical device is connected to the connecting surface
with a heat-dissipating surface, of a part that has been arranged with the heating element, oriented to the heat-dissipating component side.

According to such an optical module, because the heat-dissipating surface, of a part arranged with a heating element, is oriented to the heat-dissipating component side, heat generated from the heating element can be efficiently dissipated to the heat-dissipating component, leading to improvement in heat dissipation.

With the optical module, wherein preferably an elastic member that dissipates heat is provided to be in contact with the heat-dissipating component between the heat-dissipating component and the heat-dissipating surface.

According to such an optical module, by placing an elastic member that dissipates heat between the heat-dissipating component and the heat-dissipating surface, the gap between the heat-dissipating component and the heat-dissipating surface can be filled, and the contacting area in the heat-dissipating surface can be increased, thus heat-dissipating efficiency can further improve. Further, a tolerance between the optical device and the heat-dissipating component can be absorbed by utilizing elasticity of the elastic member.

With the optical module, wherein preferably a positioning part that positions the elastic member in a direction along the contacting surface is included.

According to such an optical module, misalignment of the arranged elastic member in a direction along the connecting surface will be suppressed, thus stable heat-dissipation performance can be maintained, and difficulty in assembling due to misalignment of the elastic member while assembling can be suppressed, in order to improve assembling.

With the optical module, wherein preferably the optical device is fixed with a screw from the heat-dissipating surface side, and a gap is provided between the screw and the heat-dissipating component.

According to such an optical module, when a gap is provided between the screw and the heat-dissipating component, the screw does not interfere with the heat-dissipating component, and it is possible to prevent a situation where absorbing of a tolerance between the optical device and the heat-dissipating component with the elastic member is obstructed.

With the optical module, wherein preferably the optical device includes a heat-dissipating part having the heat-dissipating surface, and the heat-dissipating part is supported from the substrate side with a supporting member that has been attached to the substrate.

According to such an optical module, because the optical device is supported with the supporting member, a cutout does not necessarily have to be made in the substrate in order to attach the optical device, and wiring can be performed inside the substrate, and components can be mounted on a surface opposite to the connecting surface, and a space in which wiring of the substrate can be performed and components can be mounted increases.

With the optical module, wherein preferably the supporting member includes
 a plurality of supporting columns each having one end that contacts the connecting surface and another end that contacts the heat-dissipating part, and
 a joining part that is provided between the connecting surface and the optical device, the joining part joining the plurality of supporting columns.

According to such an optical module, because the plurality of the supporting columns are joined with the joining part, the supporting columns can further stably support the heat-dissipating part. Further, with the decrease in the number of the components, assembling becomes easier.

With the optical module, wherein preferably a space is formed between the joining part and the connecting surface.

According to such an optical module, by utilizing the space formed between the joining part and the connecting surface, wiring can be performed on the connecting surface, and a space in which wiring of the substrate can be performed further increases.

With the optical module, wherein preferably the optical device is arranged between the connecting surface and the heat-dissipating component, and the plurality of pins are connected to the connecting surface in a bent state.

According to such an optical module, the optical device can be mounted on the substrate without providing through holes in the substrate, and a space in which wiring of the substrate can be performed and components can be mounted increases.

First Embodiment

Comparative Example

In describing an optical module of a first embodiment of the present invention, a configuration of an optical module 10 of a comparative example will be first described with reference to FIG. 11.

FIG. 11 is a front schematic view explaining a configuration of an optical module 10 of a comparative example. FIG. 11 shows a heating element 20 drawn by dotted lines.

In this optical module 10, an optical device 2B including a heating element 20 inside is connected to a connecting surface 300a of a substrate 300 with a plurality of pins 212a by being fitted in a cutout 300b formed in the substrate 300. The optical device 2B and the substrate 300 are contained in a housing 4 that is formed by combining an upper housing 41 and a lower housing 42. Heat-dissipating fins 410 to improve heat-dissipation efficiency are provided to the upper housing 41.

In the optical device 2B, the heating element 20 is arranged on a heat-dissipating part 211 including a heat-dissipating surface 211a. In this comparative example, the heat-dissipating surface 211a is in contact with the lower housing 42. A part of the heat-dissipating part 211 has the function as a fixing part, and for example, the heat-dissipating part 211 is attached to the lower housing 42 with such as a plurality of screws (not shown).

The heating element 20 is surrounded with side wall parts 212, and when a lid body 22 is attached to the side wall parts 212 from the upper housing 41 side, the heating element 20 is hermetically sealed within the space formed with the heat-dissipating part 211 and the side wall parts 212 (with a body 21). The heat generated with the heating element 20 is mainly dissipated toward a device-side motherboard 11 through the heat-dissipating surface 211a and the lower housing 42.

In other words, in this comparative example, most of the heat generated from the heating element 20 is not dissipated toward the upper housing 41 side provided with the heat-dissipating fins 410, but is dissipated toward the lower housing 42 side attached to the device-side motherboard 11. As a result, heat-dissipating efficiency is not satisfactory.

<Configuration of Optical Module 1>

Next, a configuration of an optical module 1 of a first embodiment of this invention is described with reference to FIG. 1 to FIG. 4.

Figure 2:
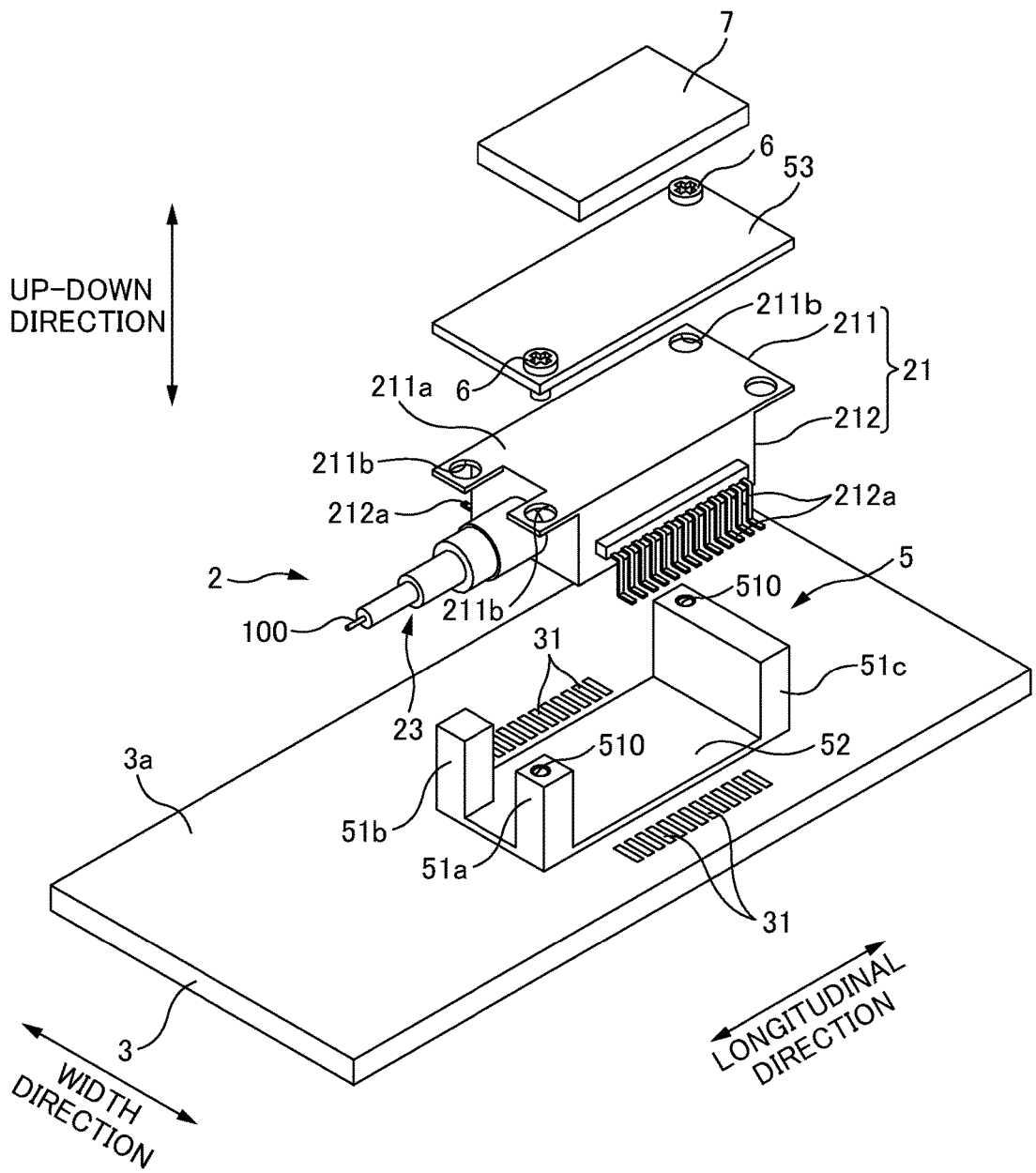
FIG. 2 is an exploded perspective view showing a configuration of components excluding a housing of an optical module of a first embodiment.
Figure 3:
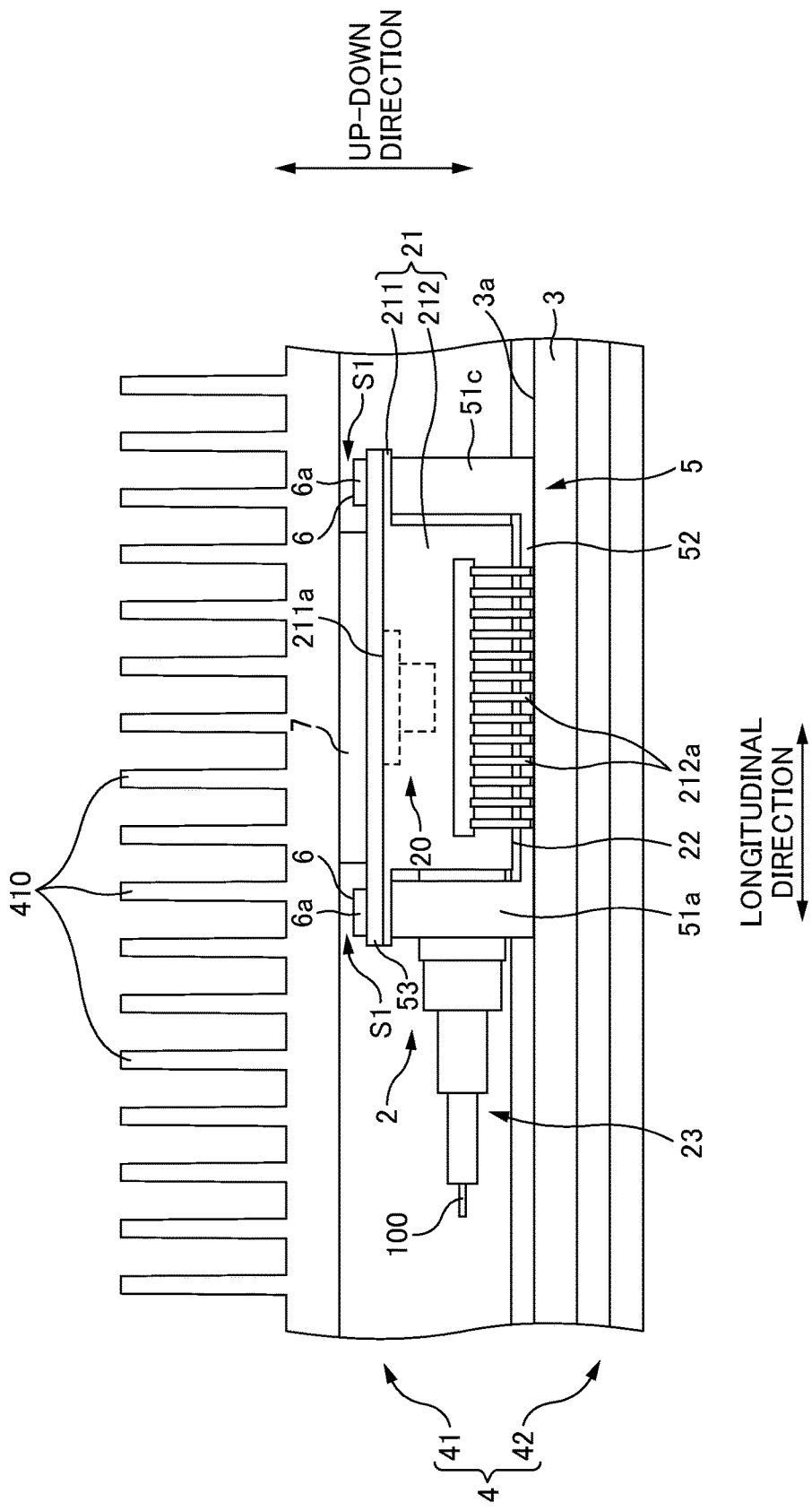
FIG. 3 is a side view showing an optical module of a first embodiment.
Figure 4:
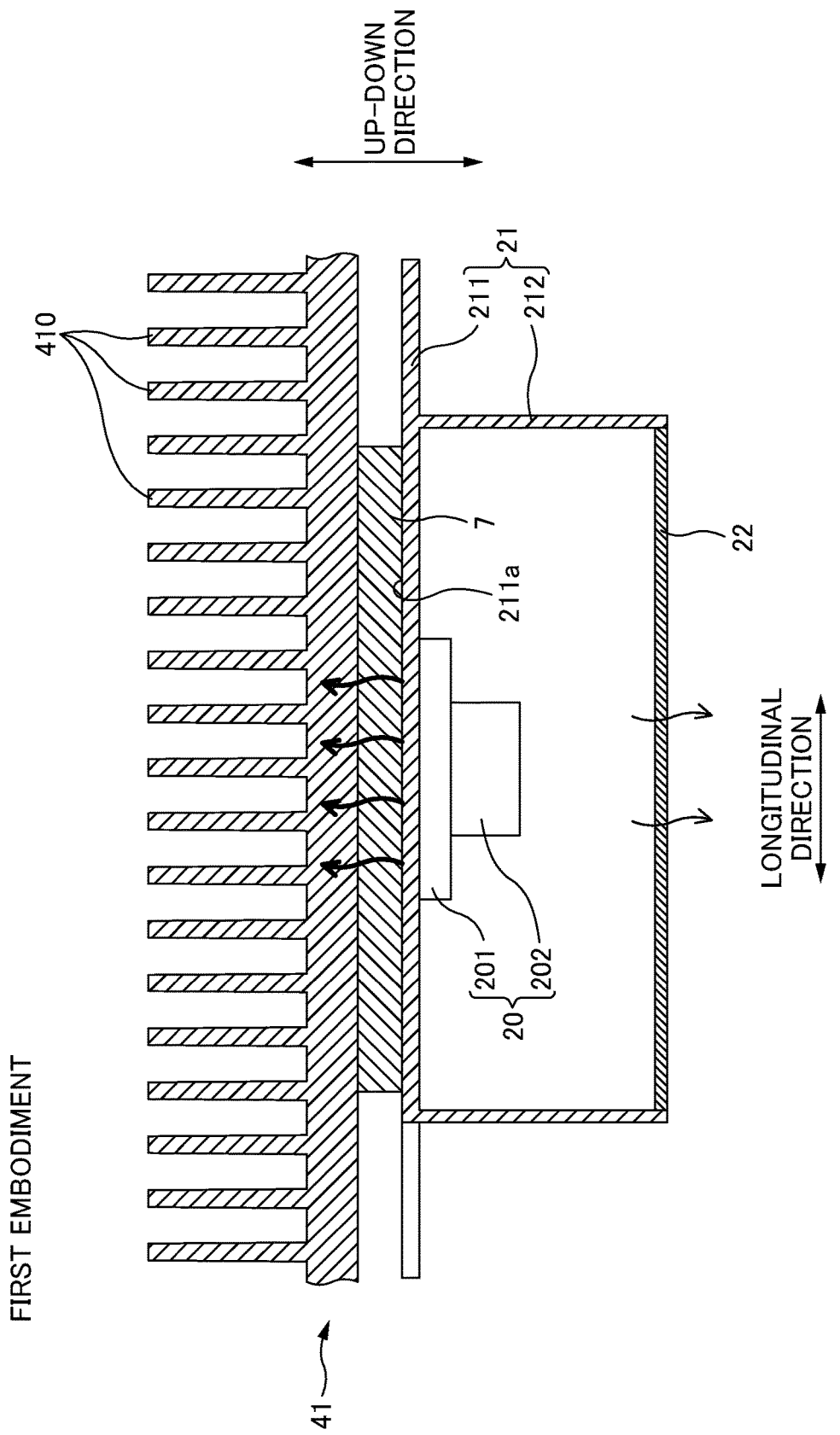
FIG. 4 is a sectional explanatory view explaining an inner structure of an optical device and a manner of dissipating heat of an optical module of a first embodiment.

FIG. 1 is a perspective view showing a configuration example of the optical module 1 of the first embodiment. FIG. 2 is an exploded perspective view showing a configuration of components excluding a housing 4 in the optical module 1. FIG. 3 is a side view showing the optical module 1. FIG. 4 is a sectional explanatory view to describe an interior structure of an optical device 2 and the manner of dissipating heat.

As shown in FIG. 1, the optical module 1 includes an optical fiber 100, a butterfly-type optical device 2 including a plurality of pins 212a, a substrate 3 including a connecting surface 3a connected with the plurality of pins 212a, and the housing 4 that contains the substrate 3 mounted with the optical device 2. Further, in this embodiment, a supporting member 5 is attached to the substrate 3, and an elastic member 7 is provided between the optical device 2 and the housing 4.

In this optical module 1, an elongating direction of the optical fiber 100 is defined as a "longitudinal direction", and of the directions that intersect with the longitudinal direction, a direction parallel to the substrate 3 is defined as a "width direction", and a direction perpendicular to the substrate 3 is defined as an "up-down direction". It should be noted that, of the up-down direction, the substrate 3 side seen from the optical device 2 is to be a downward direction, and an opposite side of the downward direction is to be an upward direction.

As an example of the optical device 2, an LD module using a butterfly-type package is described below. "LD" is an abbreviation of Laser Diode. The optical device 2 includes, for example, a light modulator that utilizes an electroabsorption effect of a semiconductor such as an EA modulator. The optical device 2 is not limited to the LD module, and may be an optical component using the butterfly-type package. Further, "EA" is an abbreviation of Electroabsorption.

As shown in FIG. 2 to FIG. 4, the optical device 2 includes a body 21, a lid body 22, and a boot 23 that protects the optical fiber 100 exposed to the outside from the body 21. Further, a Peltier device 201 with a large heating value and a heating element 20 including an LD chip 202 is contained in the interior space of the body 21 (refer to FIG. 4).

The body 21 includes a heat-dissipating part 211 including a heat-dissipating surface 211a that dissipates heat generated from the heating element 20 and side wall parts 212 that surround the heating element 20 from the longitudinal direction and the width direction. It should be noted that, in this embodiment the heat-dissipating part 211 and the side wall parts 212 are formed integrally, but the heat-dissipating part 211 and the side wall parts 212 may be formed as separate members and then combined together.

The heat-dissipating part 211 is plate-shaped and includes parts that jut out to both sides in the longitudinal direction from the side wall parts 212. The jutting out parts are formed with a plurality (four in this embodiment) of through holes 211b that go through in the up-down direction. As shown in FIG. 4, the heating element 20 is attached to a surface to a lower side of the heat-dissipating part 211, and a surface to an upper side is to be the heat-dissipating surface 211a.

A plurality of pins 212a are provided aligned in the longitudinal direction to both sides of the side wall parts 212 in the width direction. One end part of each of the plurality of pins is connected to the connecting surface 3a of the substrate 3. The plurality of pins 212a are bent at two places to have two parts along the width direction (along the connecting surface 3a) and a part along the up-down direction (that intersects the connecting surface 3a). Of the two parts along the width direction, one part along the width direction is connected to the connecting surface 3a of the substrate 3, and the other part along the width direction is protruded to the outside from the side wall parts 212 in the width direction.

As shown in FIG. 4, the lid body 22 is attached to the side wall parts 212 from below to oppose the heat-dissipating part 211, and puts a lid on the interior space formed with the heat-dissipating part 211 and the side wall parts 212. In this way, the heating element 20 is contained in the space in a hermetically sealed state.

With the optical device 2 in this embodiment, the heat-dissipating part 211 is positioned above the lid body 22. On the other hand, with the optical device 2B in the above-described comparative example, the lid body 22 is positioned higher than the heat-dissipating part 211. In other words, with the optical device 2 of this embodiment, the optical device 2B in the comparative example is mounted on the substrate 3 in a reversed state in the up-down direction.

In this case, the plurality of through holes 211b formed in the heat-dissipating part 211 are to be fixing parts to fix the optical device 2.

The substrate 3 is namely a printed circuit board (PCB), and although not shown in the drawings, a plurality of electronic parts and the like other than the optical module 1 are mounted, and a plurality of wiring patterns are formed. As shown in FIG. 2, the connecting surface 3a is provided with a plurality of connecting terminals 31 to be connected with one end part (one part along the width direction) of each of the plurality of pins 212a of the optical device 2.

As shown in FIG. 1, the housing 4 is formed by combining the upper housing 41 arranged to the connecting surface 3a side of the substrate 3 and the lower housing 42 attached to the device-side motherboard (not shown) arranged to the opposite side of the connecting surface 3a. It should be noted that, the device motherboard is to be arranged to the lower side of the lower housing 42 (refer to FIG. 11).

The optical device 2 and the substrate 3 are contained inside the housing 4 by being arranged inside the lower housing 42 and with the upper housing 41 being attached from above to the lower housing 42. Thus, as shown FIG. 3, the optical device 2 is connected to the connecting surface 3a of the substrate 3 with the heat-dissipating surface 211a oriented to the upper housing 41 side. FIG. 3 shows the heating element 20 drawn by dotted lines.

The upper housing 41 has a plurality of heat-dissipating fins 410 above, and is one mode of the heat-dissipating component of this embodiment. The upper housing 41 (the plurality of heat-dissipating fins 410), which is the heat-dissipating component, is arranged to the connecting surface 3a side when seen from the substrate 3. Thus, because the upper housing 41 is positioned to the opposite side to the device-side motherboard, the upper housing 41 has a better heat-dissipating efficiency than the lower housing 42.

As shown in FIG. 4, in the optical device 2, the heat-dissipating surface 211a, of a part arranged with the heating element 20, is oriented to the upper housing 41 side. Thus, heat generated from the heating element 20 can be efficiently dissipated to the upper housing 41, compared to when heat is dissipated toward the lower housing 42 side, as shown in the comparative example (refer to FIG. 11), more specifically, when dissipating heat to the device-side motherboard side or when dissipating heat to the heat-dissipating component arranged to the opposite side (lower side) of the heat-dissipating surface 211a and the like. Accordingly, heat-dissipation can be improved for the optical module 1 overall.

In this embodiment, the housing 4 (the upper housing 41 and the lower housing 42) are shaped and made of a metal such as aluminum, for example, but the material is not particularly limited to metal, and may be a material with satisfactory thermal conductivity.

Further, in this embodiment, the optical device 2 is arranged between the connecting surface 3a of the substrate 3 and the upper housing 41 which is the heat-dissipating component, and the optical device 2 is connected to the connecting surface 3a with the plurality of pins 212a in a bent state. Thus, the optical device 2 can be mounted to the substrate 3 without providing such as through holes in the substrate 3, and in the substrate 3 space in which wiring can be performed and in which components can be mounted increases.

The supporting member 5 is attached to the substrate 3 with such as a double-faced adhesive tape, for example, and supports the heat-dissipating part 211 of the optical device 2 from the substrate 3 side (lower side). In the case where this supporting member 5 is not provided, a cutout or a hole shown in the comparative example (refer to FIG. 11) needs to be provided to the substrate 3 in order to fix the optical device 2 to the substrate 3 with the through holes 211b as the fixing parts. This results in decrease in mounting space of the substrate 3. On the other hand, because the heat-dissipating part 211 of the optical device 2 is supported with the supporting member 5 in this embodiment, a cutout or a hole does not need to be provided in the substrate 3, and such as wiring inside the substrate 3 and arranging components to an opposite side surface to the contacting surface 3a (an opposing surface to the lower housing 42) can be performed, and a space for mounting the substrate 3 increases.

The supporting member 5 may be attached to the substrate 3 with such as adhesives other than the double-faced adhesive tape, but there is no limit to the attaching method of the supporting member 5 to the substrate 3. The optical module 1 does not necessarily have to include the supporting member 5, as long as the heat-dissipating surface 211a of the optical device 2 is at least mounted to the substrate 3 with the heat-dissipating surface 211a oriented to the upper housing 41 side.

As shown in FIG. 2, the supporting member 5 includes supporting columns 51a, 51b, 51c, a plate-shaped joining part 52 along the substrate 3, and a plate-shaped reinforcing part 53 arranged opposed to the joining part 52. In this embodiment, the supporting pillars 51a, 51b, 51c and the joining part 52 are integrally formed, however the supporting pillars 51a, 51b, 51c and the joining part 52 may be formed as different members and the supporting pillars 51a, 51b, 51c and the joining part 52 may be connected. Further, the supporting member 5 does not necessarily have to include the joining part 52.

One end of each of the supporting pillars 51a, 51b, 51c, contacts the connecting surface 3a of the substrate 3, and the other end of each of the supporting pillars 51a, 51b, 51c contacts the heat-dissipating part 211. More specifically, the other end of each of the supporting pillars 51a, 51b, 51c, contacts the parts of the heat-dissipating part 211 that jut out to both sides in the longitudinal direction. The supporting columns 51a, 51b, are arranged to the side in which the optical fiber 100 is exposed in the longitudinal direction, and the supporting column 51c is arranged to the other side in the longitudinal direction.

In the state where the optical device 2 is supported with the supporting member 5, to make the optical fiber 100 and the boot 23 not contact the supporting columns 51a, 51b, the supporting column 51a and the supporting column 51b are arranged apart by a predetermined distance in the width direction. On the other hand, the supporting column 51c is provided over the width direction of the joining part 52. Further, a screw hole 510 is formed to each of the other end side (heat-dissipating part 211 side) of the supporting columns 51a, 51c.

The joining part 52 is provided so as to join the three supporting columns 51a, 51b, 51c, between the connecting surface 3a of the substrate 3 and the lid body 22 of the optical device 2. Because the supporting columns 51a, 51b, 51c, are joined with the joining part 52 in this way, the supporting columns 51a, 51b, 51c, can more stably support the heat-dissipating part 211, compared to the case where the separate supporting columns 51a, 51b, 51c each supports the heat-dissipating part 211. Further, the number of components can be reduced by providing the joining part 52, and compared to the case where each of the supporting columns 51a, 51b, 51c, is attached to the substrate 3, assembly of the optical module 1 becomes easy.

As shown in FIG. 3, the contacting surface 3a and the joining part 52 are in contact with each other, but the lid body 22 and the joining part 52 have a gap in between. The above configuration in which the lid body 22 and the joining part 52 are not contacted with each other is preferable because as the lid body 22 is formed from a thin sheet weaker in strength than the heat-dissipating part 211, in the case where a force is applied to the optical device 2 from above to below, the lid body 22 is prevented from being pressed against the joining part 52.

The reinforcing part 53 is arranged to the heat-dissipating surface 211a side (upper side) of the heat-dissipating part 211. The reinforcing part 53 is attached to the supporting columns 51a, 51b, 51c, with a plurality (in this embodiment two) of screws 6 in a state sandwiching a heat-dissipating part 211 between the supporting columns 51a, 51b, 51c, and the reinforcing part 53. Various attaching methods of the reinforcing part 53 can be given other than the attaching method with the screws 6. These methods will be described later.

This reinforcing part 53 has a function as a reinforcing member of the heat-dissipating part 211 when the thickness of the heat-dissipating part 211 (a height in the up-down direction) is thin, and also the reinforcing part 53 has a function as a spacer when the space between the heat-dissipating surface 211a and the upper side housing 41 is large.

Thus, when the heat-dissipating part 211 is attached to the supporting member 5 with the screws 6, fixing of the heat-dissipating part 211 and the supporting member 5 becomes stable compared to when fixing with such as an adhesive, for example, thus fixing of the optical device 2 and the supporting member 5 becomes more stable. A filler with a high heat conductivity, for example a thermal grease, can be used between the reinforcing part 53 and the heat-dissipating part 211.

As shown in FIG. 2, in this embodiment, one screw 6 of the two screws 6 is attached to a position corresponding to the supporting column 51a, and the other screw 6 is attached positioned diagonally to one screw 6. There does not necessarily have to be two screws 6, and for example, in correspondence to the four through holes 211b, four screws 6 may fix the heat-dissipating part 211 to the supporting member 5, or a plurality of the screws 6 do not have to fix the heat-dissipating part 211. Further, the optical device 2 and the supporting member 5 do not necessarily have to be fixed with the screws 6, and for example, the above may be fixed with such as an adhesive.

The supporting member 5 can be attached to the substrate 3 by utilizing the plurality of the screws 6. For example, there is a method of making some of the screws 6 or all the screws 6, of the plurality of screws 6, go through the supporting member 5 and the substrate 3 to fix the supporting member 5 and the substrate 3 to the lower housing 42, and a method of making some of the screws 6 or all the screws 6, of the plurality of screws 6, go through the supporting member 5 to fix the supporting member 5 and the substrate 3 to the substrate 3.

In this embodiment, the supporting member 5 is formed from metal such as an aluminum, for example, but the supporting member 5 does not necessarily have to be formed from metal, and may be formed from such as resin, for example, and as long as the material has a strength of a degree that can at least support the heat-dissipating part 211, there is no particular limitation to the material.

As shown in FIG. 3, the elastic member 7 having heat-dissipating property is provided to come in contact with the upper housing 41 between the upper housing 41 and the heat-dissipating surface 211a. The elastic member 7 is a thick sheet member formed from such as a rubber, for example.

By providing the elastic member 7 having a heat-dissipating property between the upper housing 41 and the heat-dissipating surface 211a, the upper housing 41 and the elastic member 7 contact each other, and the heat-dissipating surface 211a and the elastic member 7 contact each other, thus the contacting area of the upper housing 41 and the contacting area of the heat-dissipating surface 211a can increase, and heat transfer from the heat-dissipating surface 211a to the upper housing 41 becomes more certain. In this way, dissipation of heat generated from the optical device 2 further improves, compared to the case where the elastic member 7 is not provided. Further, a tolerance between the optical device 2 and the upper housing 41 in the up-down direction can be absorbed by utilizing the elasticity of the elastic member 7.

The size (thickness) of this elastic member 7 in the up-down direction is greater than a maximum size of a top part 6a of the screw 6. Here, the top part 6a of the screw 6 refers to a part exposed to the upper side than the heat-dissipating surface 211a. A gap S1 is provided between the upper housing 41 and the screws 6, and upper ends of the screws 6 do not contact the upper housing 41. In this way, because the screws 6 do not interfere with the upper housing 41, a situation that the screw 6 prevents the elastic member 7 from absorbing a tolerance in the up-down direction between the optical device 2 and the upper housing 41 can be suppressed.

In this embodiment, because the reinforcing part 53 of the supporting member 5 is arranged between the upper housing 41 and the heat-dissipating part 211, the elastic member 7 is provided between the upper housing 41 and the reinforcing part 53. Further, the optical module 1 does not necessarily have to include the elastic member 7, but in view of the point of absorbing a tolerance in the up-down direction between the optical device 2 and the housing 4, the elastic member 7 is preferably included.

<Positioning of Elastic Member 7>

Next, positioning of the elastic member 7 is described with reference to FIG. 5A to FIG. 5D and FIG. 6A to FIG. 6D.

Figure 5A:
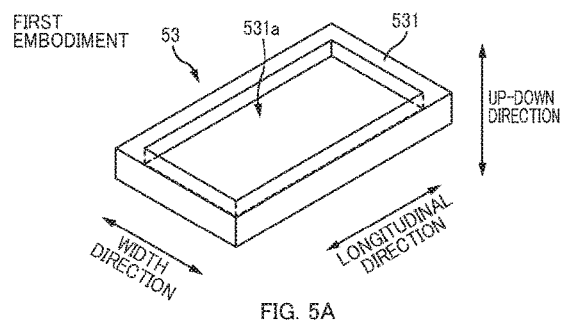
FIG. 5A to FIG. 5D are diagrams showing modified examples of a reinforcing part of a supporting member.
Figure 5B:
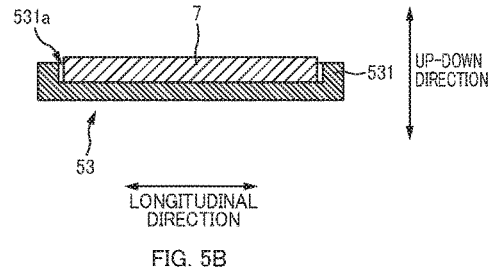
Figure 5C:
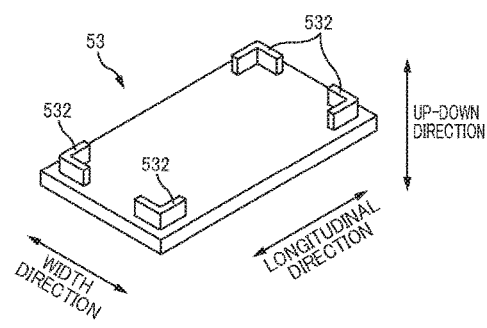
Figure 5D:
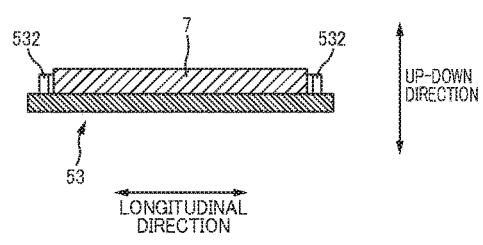

FIG. 5A to FIG. 5D show modified examples of a reinforcing part 53 of a supporting member 5. FIG. 5A to FIG. 5C are perspective views, FIG. 5B and FIG. 5D are cross-sectional views showing a state provided with an elastic member 7. FIG. 6A to FIG. 6D show modified examples of the elastic member 7. FIG. 6A and FIG. 6C are top views, FIG. 6B and FIG. 6D are cross-sectional views showing a state with the elastic member 7 provided above a reinforcing part 53 of a supporting member 5.

The reinforcing part 53 of the supporting member 5 is a member formed into a flat shape as described above, and as shown in FIG. 5A to FIG. 5D, positioning parts for positioning the elastic member 7 may be included in a direction along the connecting surface 3a of the substrate 3.

The reinforcing part 53 shown in FIG. 5A and FIG. 5B have a wall 531 that stands upwards in an outer peripheral edge, and a recess 531a that is to be arranged with an elastic member 7 inside the wall 531 is formed. In this case, the elastic member 7 arranged in the recess 531a is surrounded in the periphery with the wall 531, thus movement in the longitudinal direction and the width direction, namely a direction along the connecting surface 3a of the substrate 3, is to be restricted.

Further, the reinforcing part 53 shown in FIG. 5C and FIG. 5D include a plurality of sectionally L-shaped upward projections 532 that protrude upwards. The elastic member 7 is arranged within a region surrounded with the plurality of the upward projections 532. In this case, the elastic member 7 is restricted with the plurality of upward projections 532 from moving in the longitudinal direction and the width direction, namely a direction along the connecting surface 3a of the substrate 3.

In this way, when the wall 531 and the plurality of upward projections 532 function as positioning parts to position the elastic member 7 in a direction along the connecting surface 3a of the substrate 3, misalignment of the elastic member 7 in the direction along the connecting surface 3a is suppressed. As a result, a stable heat-dissipating property can be maintained, and difficulty of assembling due to misalignment of the elastic member 7 while assembling can be suppressed. Thus, assembling can be improved.

With the methods shown in FIG. 6A to FIG. 6D, misalignment of the elastic member 7 can be suppressed. In this case, the configuration of the elastic member 7 is changed, and the configuration of the reinforcing part 53 of the supporting member 5 is not changed.

The elastic member 7 shown in FIG. 6A and FIG. 6B is formed with through holes 71a that penetrate through the up-down direction in parts corresponding to places where screws 6 are to be attached. The through hole 71a is formed larger than the size along the width direction of a top part 6a of the screw 6 and the size along the longitudinal direction. The screws 6, however, are attached to the supporting member 5 (only the reinforcing part 53 is shown in FIG. 6B) in a state penetrating the elastic members 7.

In this case, the elastic member 7 is restricted from moving in the longitudinal direction and the width direction with the top parts 6a of the screws 6. In FIG. 6A and FIG. 6B, the elastic member 7 is formed with two rectangular through holes 71a, however, there is no particular limitation regarding the shape and the number of the through holes 71a.

Similarly, the elastic member 7 shown in FIG. 6C and FIG. 6D is formed with through holes 72a that penetrate through in the up-down direction in parts corresponding to places where the screws 6 are to be attached. The through hole 72a, however, is smaller than the size of a top part 6a of the screw 6 along the width direction and the size along the longitudinal direction, and the through hole 72a is formed to a size in which a peripheral surface of a screwing part 6b can come into contact. In other words, with the screw 6, the screwing part 6b goes through the through hole 72a, but the top part 6a does not go through the through hole 72a.

In this case, the screw 6 fixes the elastic member 7 together with the reinforcing part 53 and the heat-dissipating part 211 (refer to FIG. 3) of the optical device 2. In this way, the elastic member 7 is restricted from moving in the longitudinal direction and the width direction. Also in FIG. 6C and FIG. 6D, the elastic member 7 is formed with two through holes 72a, but the number of the through holes 72a is not particularly limited.

As shown in FIG. 6D, in the elastic member 7, a peripheral part of a part that is pressed downwards with the top part 6a of the screw 6 is preferably in a downwardly dented state. As a method of denting the peripheral part, for example, there is given such as a method of compressing the elastic member 7 downwards with the top part 6a of the screw 6, and a method of making the thickness of the peripheral part in the up-down direction thin in advance.

In this way, by making the peripheral part of the part to be pressed downward with the top part 6a of the screw 6 to be in a downward dented state in the elastic member 7, a gap is provided between the top part 6a of the screw 6 and the upper housing 41 (refer to FIG. 3), and the upper end of the screw 6 (the upper end of the top part 6a) does not contact with the upper housing 41.

Thus, because the screw 6 does not interfere with the upper housing 41, a situation in which the screw 6 will prevent absorbing a tolerance in the up-down direction with the elastic member 7 is suppressed, and because the elastic member 7 certainly contacts with the upper housing 41, the transfer of heat from the heat-dissipating surface 211a (not shown) side to the upper housing 41 becomes more certain, leading to improving of the heat-dissipation efficiency.

As described above, by utilizing the screw 6, the elastic member 7 can be positioned in the longitudinal direction and the width direction, and stable heat-dissipation property can be maintained and assembling can be improved, as described above.

<Fixing Method of Reinforcing Part 53>

Next, fixing methods of the reinforcing part 53 of the supporting member 5 are described with reference to FIG. 7A and FIG. 7B.

Figure 7A:
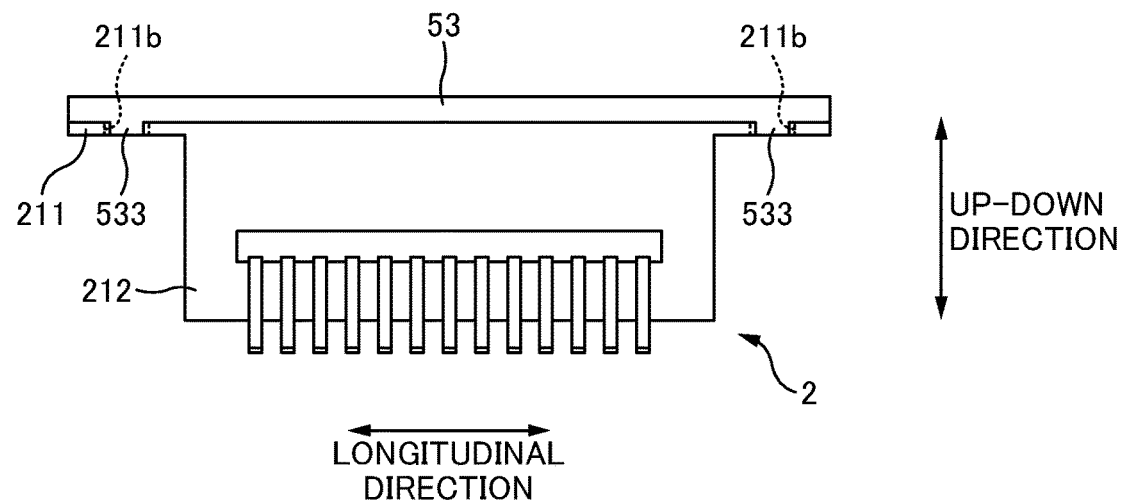
FIG. 7A and FIG. 7B are side schematic views showing modified examples of a reinforcing part of a supporting member.
Figure 7B:
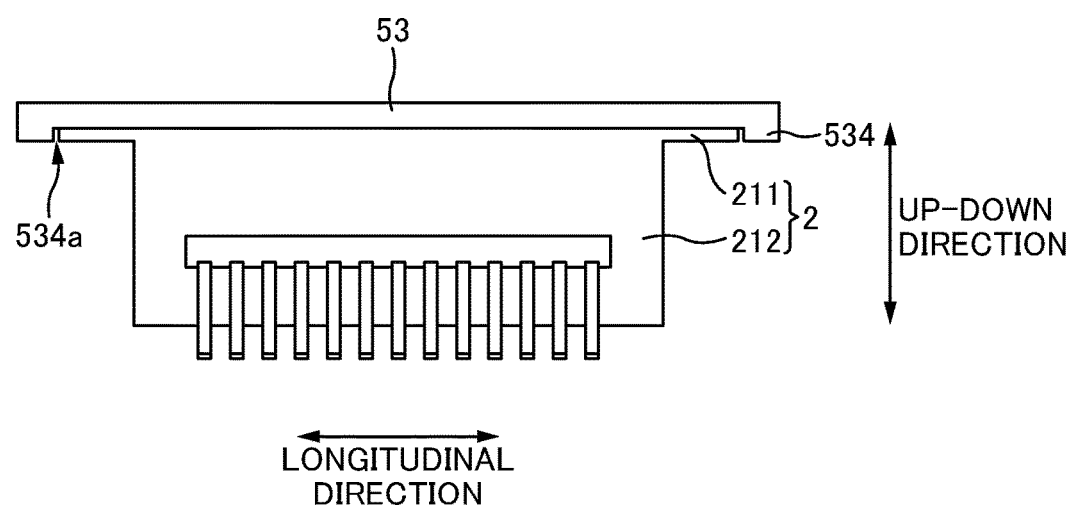

FIG. 7A and FIG. 7B are side schematic views showing modified examples of the reinforcing part 53 of the supporting member 5.

Regarding the fixing method of the reinforcing part 53 of the supporting member 5, other than the method of fixing with the plurality of screws 6 as described above, a fixing method to be described below may be described.

The reinforcing part 53 shown in FIG. 7A includes downward projections 533 projecting downward in positions corresponding to through holes 211b formed in the heat-dissipating part 211 of the optical device 2. The downward projections 533 fit in the through holes 211b when the reinforcing part 53 is arranged on the heat-dissipating part 211. In this way, the reinforcing part 53 is positioned in the longitudinal direction and the width direction, namely in directions along the connecting surface 3a of the substrate 3.

With the downward projections 533 fitted in the through holes 211b in this way, a pressing force in the up-down direction is applied with the upper housing 41 and the elastic member 7 to fix the reinforcing part 53 to the optical device 2.

The reinforcing part 53 shown in FIG. 7B has downward plate parts 534 projecting downward in the outer sides in the longitudinal direction and the width direction of the heat-dissipating part 211 of the optical device 2. A space 534a is formed inside each of the downward plate parts 534. In regard to the downward plate part 534, a downward end surface is positioned at the same position as a lower surface (a surface to the opposite side of the heat-dissipating surface 211a) of the heat-dissipating part 211 or lower than such a position.

When the reinforcing part 53 is arranged with respect to the optical device 2, the heat-dissipating part 211 is arranged in the space 534a, thus the reinforcing part 53 is positioned in the longitudinal direction and the width direction, namely the directions along the contacting surface 3a of the substrate 3.

In the state where the heat-dissipating part 211 is arranged in the space 534a of the reinforcing part 53 in this way, the reinforcing part 53 can be fixed to the optical device 2 by applying a pressing force in the up-down direction with the upper housing 41 and the elastic member 7.

The configuration of the reinforcing part 53 does not necessarily have to be changed, and the reinforcing part 53 can be fixed with respect to the optical device 2 by applying a pressing force in the up-down direction with the upper housing 41 and the elastic member 7.

According to these fixing methods, a plurality of screws 6 do not necessarily have to be used, thus the number of components can be reduced, and assembling becomes easy. Further, in this case, a filler with a high heat conductivity, for example, thermal grease, may be used between the heat-dissipating surface 211a and the reinforcing part 53.

Second Embodiment

Figure 8:
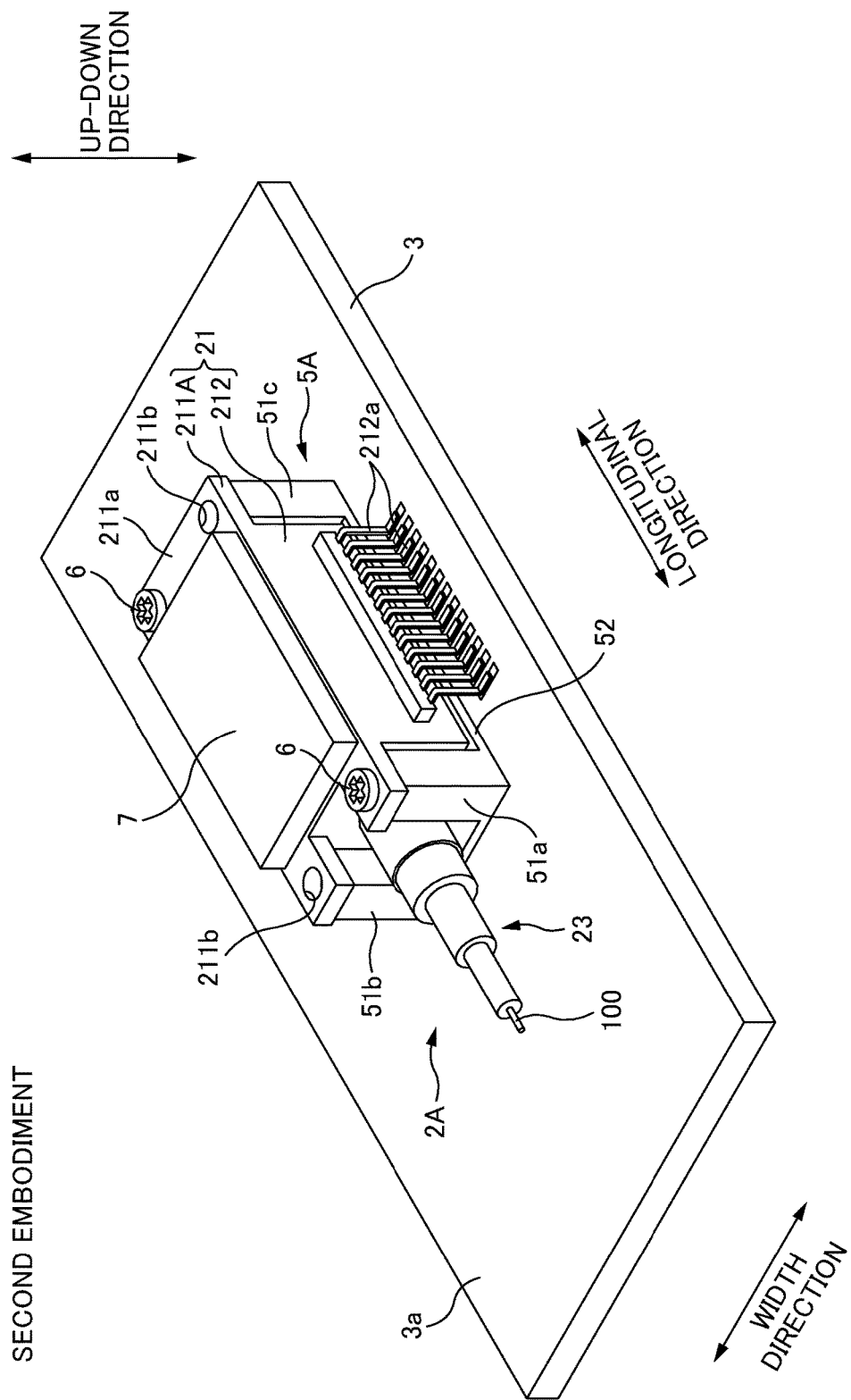
FIG. 8 is a perspective view showing a configuration of components excluding housings of an optical module of a second embodiment of this invention.

Next, with reference to FIG. 8, the configuration of an optical module according to a second embodiment of this invention will be described. In FIG. 8, structural elements that are the same as those described regarding the optical module 1 according to the first embodiment will be given the same reference numerals and explanations will be omitted. It will be the same for the third and the fourth embodiments to be described below.

FIG. 8 is a perspective view showing a configuration of components excluding a housing 4 of the optical module according to the second embodiment. In FIG. 8, although the housing 4 is not shown, as similar to the first embodiment, in this embodiment an upper housing 41 including a plurality of heat-dissipating fins 410 is arranged to the upper side of an elastic member 7, and arranged to a connecting surface 3a side when seen from a substrate 3.

Also in this embodiment, as similar to the first embodiment, an optical device 2A is connected to the connecting surface 3a of the substrate 3 with a heat-dissipating surface 211a, of apart arranged with a heating element 20, oriented to the upper housing 41 as the heat-dissipating component. In this way, as shown in a comparative example (refer to FIG. 11), heat generated from the heating element 20 can be dissipated efficiently to the upper housing 41, compared to the case where heat is dissipated to the lower housing 42 side.

With the optical device 2A in this embodiment, the thickness in the up-down direction of the heat-dissipating part 211A is formed thicker than the thickness in the up-down direction of the heat-dissipating part 211 of the optical device 2 in the first embodiment. Specifically, the thickness in the up-down direction of the heat-dissipating part 211A is a thickness to a degree where the thickness in the up-down direction of the heat-dissipating part 211 in the first embodiment and the thickness in the up-down direction of the reinforcing part 53 of the supporting member 5 are added.

Thus, because the strength of the heat-dissipating part 211A is stronger than the strength of the heat-dissipating part 211 of the optical device 2 in the first embodiment, the supporting member 5A does not include a reinforcing part and is configured from supporting columns 51a, 51b, 51c, and a joining part 52. The heat-dissipating part 211A is attached directly to the supporting member 5A with a plurality of screws 6 from the heat-dissipating surface 211a side.

As a result, the supporting member 5A does not require a reinforcing part, and can be configured with a small number of members, thus being able to reduce cost and reduce time. Further, the heat-dissipating part 211A and the supporting member 5A are directly fixed with a plurality of screws 6, thus the optical device 2A and the supporting member 5A can be fixed more stably.

Third Embodiment

Next, a configuration of the optical module according to a third embodiment of this invention is described with reference to FIG. 9A and FIG. 9B.

Figure 9A:
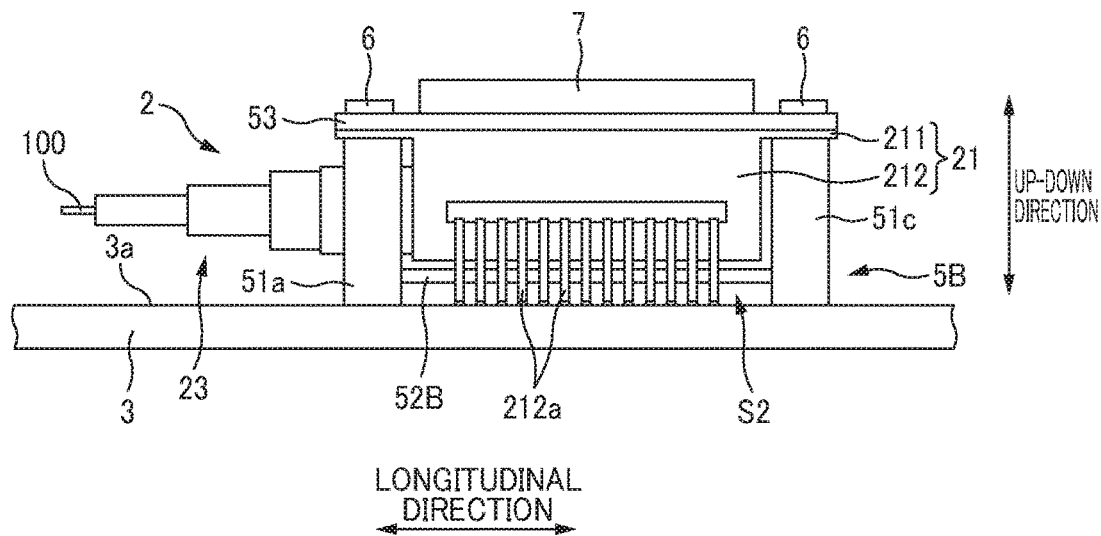
FIG. 9A and FIG. 9B show a configuration of components excluding housings in an optical module of a third embodiment of this invention.
Figure 9B:
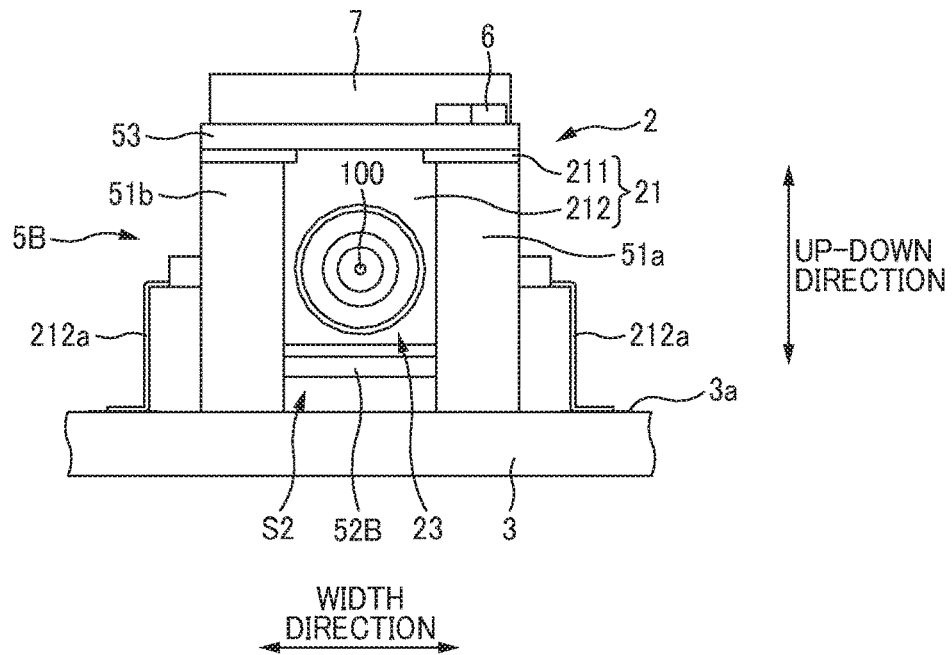

FIG. 9A and FIG. 9B show a configuration of components excluding a housing 4 of an optical module according to the third embodiment. FIG. 9A is a side view and FIG. 9B is a front view. In FIG. 9A and FIG. 9B, although the housing 4 is not shown, in this embodiment, as similar to the first embodiment, an upper housing 41 including a plurality of heat-dissipating fins 410 is arranged to an upper side of an elastic member 7 and arranged to a contacting surface 3a side when seen from a substrate 3.

In this embodiment, as similar to the first embodiment, an optical device 2 is connected to the connecting surface 3a of the substrate 3 with a heat-dissipating surface 211a, of the part arranged with a heating element 20, oriented to an upper housing 41 which is a heat-dissipating member. In this way, compared to the case of dissipating heat toward the lower housing 42 side, as shown in a comparative example (refer to FIG. 11), the heat generated from the heating element 20 can be efficiently dissipated to the upper housing 41.

In the supporting member 5B in this embodiment, a joining part 52B does not contact the connecting surface 3a of the substrate 3, and a space S2 is formed between the joining part 52B and the connecting surface 3a. In this case, the supporting member 5B is attached to the substrate 3 with one end of each of the supporting columns 51a, 51b, and 51c, being adhered to a connecting surface 3a with such as an adhesive tape, for example.

In this way, with a space S2 being provided in between the joining part 52B of the supporting member 5B and the contacting surface 3a of the substrate 3, wiring can be performed on the connecting surface 3a utilizing the space S2, and a space in which wiring can be performed on the substrate 3 increases.

Fourth Embodiment

Next, the configuration of the optical module according to the fourth embodiment of this invention is described with reference to FIG. 10.

FIG. 10 is a front view showing a configuration of an optical module according to the fourth embodiment.

In this embodiment, as similar to the first embodiment, an upper housing 41 including a plurality of heat-dissipating fins 410 is arranged to an upper side of an elastic member 7 and arranged to a contacting surface 3a side when seen from a substrate 3. An optical device 2 is connected to a connecting surface 30a of a substrate 30 with a heat-dissipating surface 211a, of a part arranged with a heating element 20, oriented to an upper housing 41 which is a heat-dissipating member. In this way, compared to the case of dissipating heat toward the lower housing 42 side, as shown in a comparative example (refer to FIG. 11), the heat generated from the heating element 20 can be efficiently dissipated to the upper housing 41.

Different from the first to the third embodiments, in this embodiment the optical device 2 is attached to the substrate 30 in a state inserted through a through hole 30b formed in the substrate 30 in the up-down direction. A plurality of pins 212a of the optical device 2 at this time are connected to the connecting surface 30a in a state along the connecting surface 30a of the substrate 30.

In this way, the plurality of pins 212a are connected to the connecting surface 30a to lie along on the connecting surface 30a, thus the plurality of pins 212a can be connected in a shortest length without being bent, and the optical device 2 can be applied to not only an optical module for low-speed signals but also an optical module for high-speed signals.

Other Points

The above embodiments are for facilitating understanding of this invention and are not for limiting understanding of the invention in any way. This invention may be changed and/or altered without departing from the gist, and needless to say this invention may include equivalents.

In the above embodiments, with the optical module 1, one optical device 2 has been mounted on the substrates 3, 30, but the number of optical devices 2 to be mounted to the substrates 3, 30, is not particularly limited, and a plurality of optical devices 2 may be mounted on the substrates 3, 30. In this case, not all the heat generating from the plurality of optical devices 2 has to be necessarily dissipated from the upper housing 41, and dissipating heat to the upper housing 41 for each optical device 2 or dissipating heat to the lower housing 42 can also be selected, to prevent a situation in which heat concentrates in one housing.

What is claimed is:

1. An optical module comprising:
   a butterfly-type optical device including
      a body that contains a heating element in an interior space,
      a lid body that puts a lid on the interior space, and
      a plurality of pins;
   a substrate including a connecting surface to which the plurality of pins are connected; and
   a heat-dissipating component arranged to the connecting surface side,
   wherein the optical device is connected to the connecting surface
      with a heat-dissipating surface, of a part that has been arranged with the heating element, oriented to the heat-dissipating component side, and
      with a gap provided to a side of the lid body opposite to a side of the interior space;
   the optical device is arranged between the connecting surface and the heat-dissipating component; and
   the plurality of pins are connected to the connecting surface in a bent state.

2. An optical module according to claim 1,
   wherein an elastic member that dissipates heat is provided to be in contact with the heat-dissipating component between the heat-dissipating component and the heat-dissipating surface.

3. An optical module according to claim 2,
   wherein a positioning part that positions the elastic member in a direction along the contacting surface is included.

4. An optical module according to claim 2,
   wherein the body of the optical device is fixed with a screw from the heat-dissipating surface side, and
   a gap is provided between the screw and the heat-dissipating component.

5. An optical module according to claim 1,
   wherein the body of the optical device includes a heat-dissipating part having the heat-dissipating surface, and the heat-dissipating part is supported from the substrate side with a supporting member that has been attached to the substrate.

6. An optical module according to claim 5, wherein the supporting member includes
a plurality of supporting columns each having one end that contacts the connecting surface and another end that contacts the heat-dissipating part, and
a joining part that is provided between the connecting surface and the lid body of the optical device, the joining part joining the plurality of supporting columns.

7. An optical module according to claim 6, wherein a space is formed between the joining part and the connecting surface.

8. An optical module according to claim 1, wherein the body of the optical device forms the interior space using a heat-dissipating part including the heat-dissipating surface and side wall parts surrounding the heating element, and
the lid body is formed with a thin sheet having a weaker strength than the heat-dissipating part.

9. An optical module comprising:
a butterfly-type optical device including
a body that contains a heating element in an interior space,
a lid body that puts a lid on the interior space, and
a plurality of pins;
a substrate including a connecting surface to which the plurality of pins are connected; and
a heat-dissipating component arranged to the connecting surface side,
wherein the optical device is connected to the connecting surface
with a heat-dissipating surface, of a part that has been arranged with the heating element, oriented to the heat-dissipating component side, and
with a gap provided to a side of the lid body opposite to a side of the interior space; and
an elastic member that dissipates heat is provided to be in contact with the heat-dissipating component between the heat-dissipating component and the heat-dissipating surface.

10. An optical module according to claim 9, wherein a positioning part that positions the elastic member in a direction along the contacting surface is included.

11. An optical module according to claim 9, wherein the body of the optical device is fixed with a screw from the heat-dissipating surface side, and
a gap is provided between the screw and the heat-dissipating component.

12. An optical module comprising:
a butterfly-type optical device including
a body that contains a heating element in an interior space,
a lid body that puts a lid on the interior space, and
a plurality of pins;
a substrate including a connecting surface to which the plurality of pins are connected; and
a heat-dissipating component arranged to the connecting surface side,
wherein the optical device is connected to the connecting surface
with a heat-dissipating surface, of a part that has been arranged with the heating element, oriented to the heat-dissipating component side, and
with a gap provided to a side of the lid body opposite to a side of the interior space;
the body of the optical device includes a heat-dissipating part having the heat-dissipating surface, and the heat-dissipating part is supported from the substrate side with a supporting member that has been attached to the substrate; and
the supporting member includes
a plurality of supporting columns each having one end that contacts the connecting surface and another end that contacts the heat-dissipating part, and
a joining part that is provided between the connecting surface and the lid body of the optical device, the joining part joining the plurality of supporting columns.

13. An optical module according to claim 12, wherein a space is formed between the joining part and the connecting surface.

* * * * *